(12) United States Patent
Fujioka et al.

(10) Patent No.: US 9,971,139 B2
(45) Date of Patent: May 15, 2018

(54) MICROSCOPE OBSERVATION CONTAINER AND OBSERVATION DEVICE

(71) Applicant: Hitachi High-Technologies Corporation, Minato-ku, Tokyo (JP)

(72) Inventors: Michiru Fujioka, Tokyo (JP); Shuhei Yamamoto, Tokyo (JP); Tsuyoshi Sonehara, Tokyo (JP); Hiromi Kusaka, Tokyo (JP); Akimasa Osaka, Tokyo (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days. days.

(21) Appl. No.: 15/305,226

(22) PCT Filed: Mar. 12, 2015

(86) PCT No.: PCT/JP2015/057245
§ 371 (c)(1),
(2) Date: Oct. 19, 2016

(87) PCT Pub. No.: WO2015/182213
PCT Pub. Date: Dec. 3, 2015

(65) Prior Publication Data
US 2017/0045726 A1 Feb. 16, 2017

(30) Foreign Application Priority Data
May 29, 2014 (JP) .................................. 2014-111658

(51) Int. Cl.
*G02B 21/33* (2006.01)
*G02B 21/08* (2006.01)
(Continued)

(52) U.S. Cl.
CPC ............ *G02B 21/33* (2013.01); *G02B 21/082* (2013.01); *G02B 21/12* (2013.01); *G02B 21/26* (2013.01); *G02B 21/34* (2013.01)

(58) Field of Classification Search
CPC ...... G02B 21/33; G02B 21/082; G02B 21/12; G02B 21/26; G02B 21/34
(Continued)

(56) References Cited

U.S. PATENT DOCUMENTS 5,870,223 A * 2/1999 Tomimatsu .............. G02B 1/06
359/392
7,619,829 B2 * 11/2009 Okazaki ............. G02B 21/0088
359/368

(Continued)

FOREIGN PATENT DOCUMENTS

JP 2010-217930 A 9/2010
JP 2015-155964 A 8/2015
(Continued)

OTHER PUBLICATIONS

International Search Report (PCT/ISA/210) issued in PCT Application No. PCT/JP2015/057245 dated Jun. 16, 2015 with English translation (Two (2) pages).
(Continued)

*Primary Examiner* — Frank Font
(74) *Attorney, Agent, or Firm* — Crowell & Moring LLP

(57) ABSTRACT

In the microscope observation container according to the present invention, an observed sample is accommodated by an objective lens barrel provided with a housing extending along the radiation direction of excitation light and an objective lens fixed to an inside surface of the housing. The microscope observation container is provided with a structure for collecting a liquid immersion medium added by dispensation, the structure having a portion contacted by the
(Continued)

objective lens barrel during observation. During observation the aforementioned portion is contacted by the objective lens barrel, and the liquid immersion medium is thereby sealed by the objective lens barrel and the structure. The aforementioned portion also has an elastic force, and is deformed so as to conform to the housing of the objective lens by the contact.

12 Claims, 9 Drawing Sheets

(51) Int. Cl.
    *G02B 21/12*     (2006.01)
    *G02B 21/26*     (2006.01)
    *G02B 21/34*     (2006.01)

(58) Field of Classification Search
    USPC .......................................................... 359/393
    See application file for complete search history.

(56) References Cited

U.S. PATENT DOCUMENTS

| | | | |
|---|---|---|---|
| 2004/0263959 A1 | 12/2004 | Dixon et al. | |
| 2006/0275918 A1 | 12/2006 | Harada et al. | |
| 2007/0145159 A1* | 6/2007 | Noguchi | G02B 21/30 |
| | | | 236/1 C |
| 2008/0247038 A1* | 10/2008 | Sasaki | G02B 21/0024 |
| | | | 359/395 |
| 2008/0252967 A1* | 10/2008 | Tomioka | G02B 21/33 |
| | | | 359/398 |
| 2008/0259446 A1* | 10/2008 | Komatsu | G02B 21/33 |
| | | | 359/391 |
| 2010/0027109 A1* | 2/2010 | Liebel | G02B 21/24 |
| | | | 359/381 |
| 2010/0315705 A1* | 12/2010 | Harada | G02B 21/33 |
| | | | 359/368 |
| 2013/0063811 A1* | 3/2013 | Fu | G02B 21/26 |
| | | | 359/391 |
| 2014/0063599 A1* | 3/2014 | Nakasho | G01N 21/01 |
| | | | 359/391 |
| 2016/0109357 A1* | 4/2016 | Lorbeer | G02B 21/34 |
| | | | 250/576 |

FOREIGN PATENT DOCUMENTS

| | | |
|---|---|---|
| WO | WO 2007/116647 A1 | 10/2007 |
| WO | WO 2007/135762 A1 | 11/2007 |

OTHER PUBLICATIONS

Japanese-language Written Opinion (PCT/ISA/237) issued in PCT Application No. PCT/JP2015/057245 dated Jun. 16, 2015 (Three (3) pages).

Japanese-language International Preliminary Report of Patentability (PCT/IPEA/409) issued in PCT Application No. PCT/JP2015/057245 dated Dec. 22, 2015 (Nine (9) pages).

\* cited by examiner

FIG. 2A
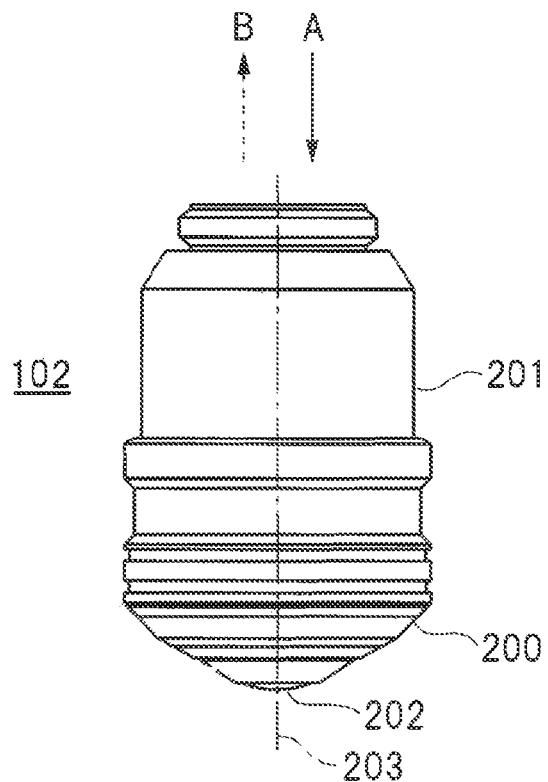
FIG. 2B
FIG. 2C
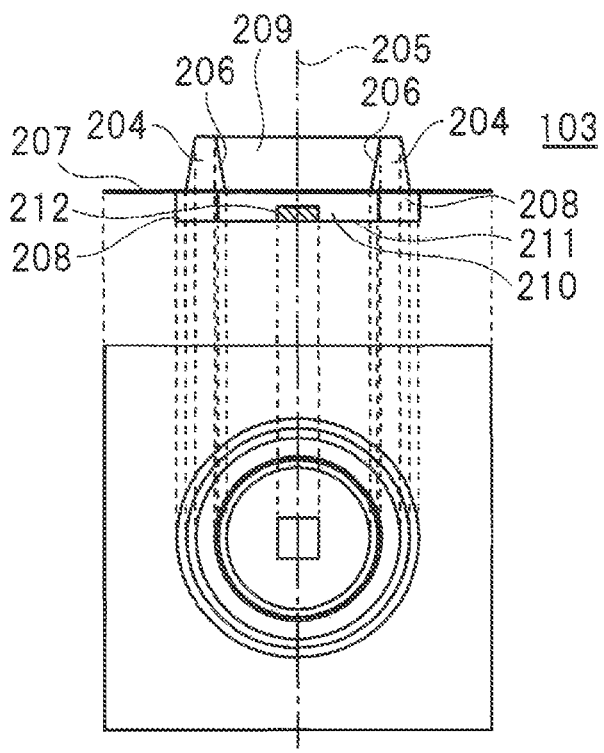

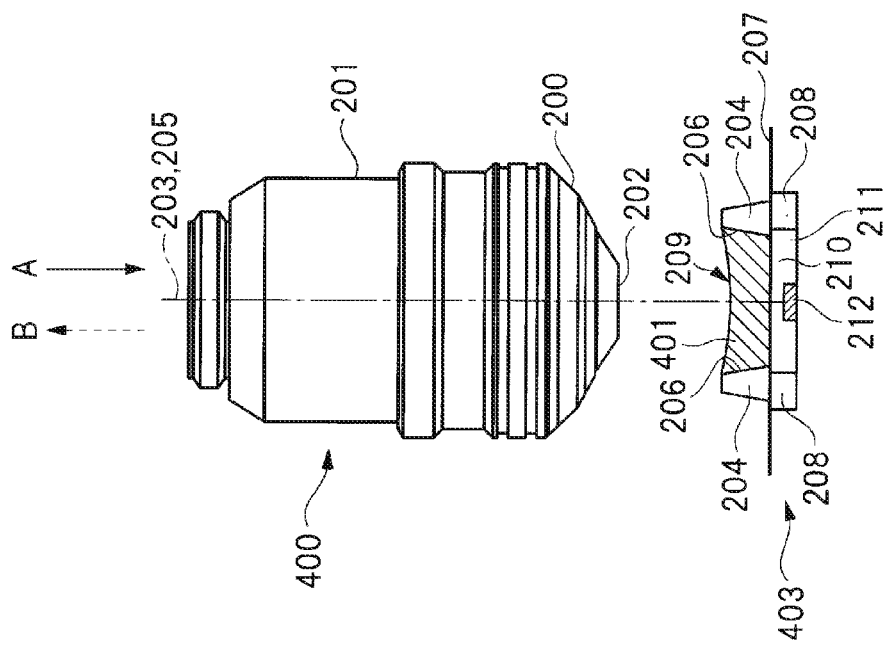
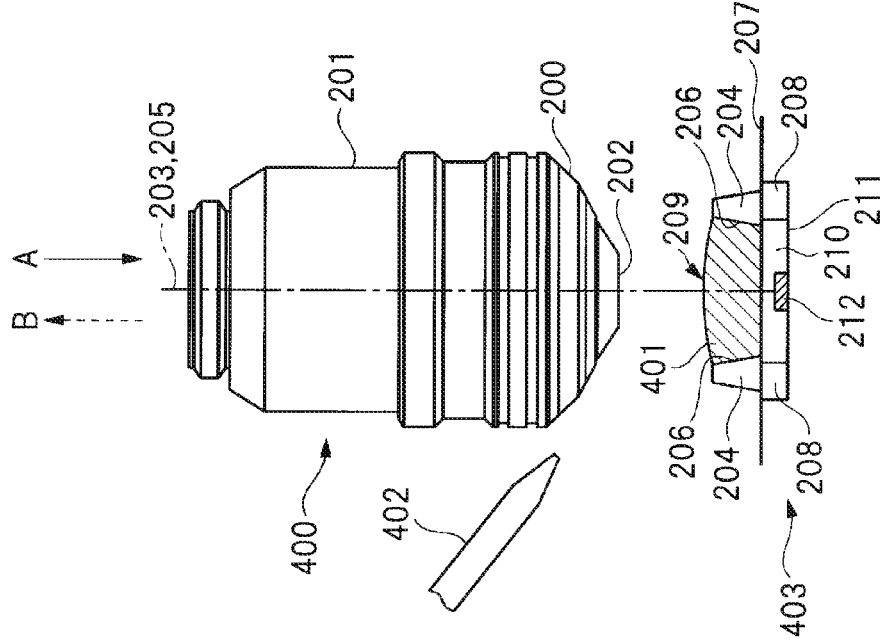

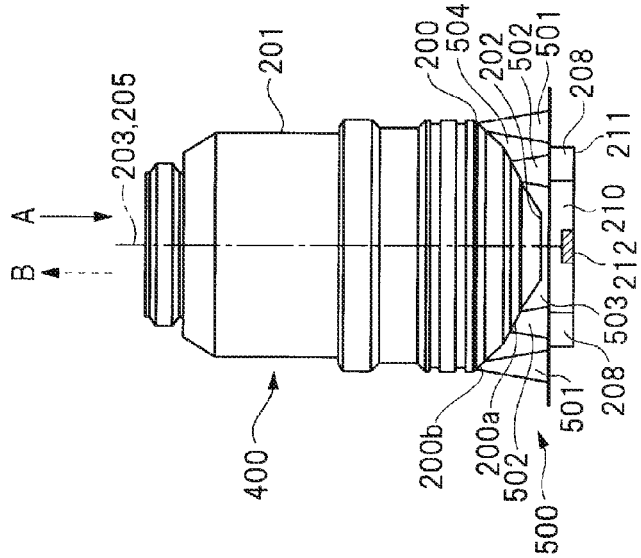
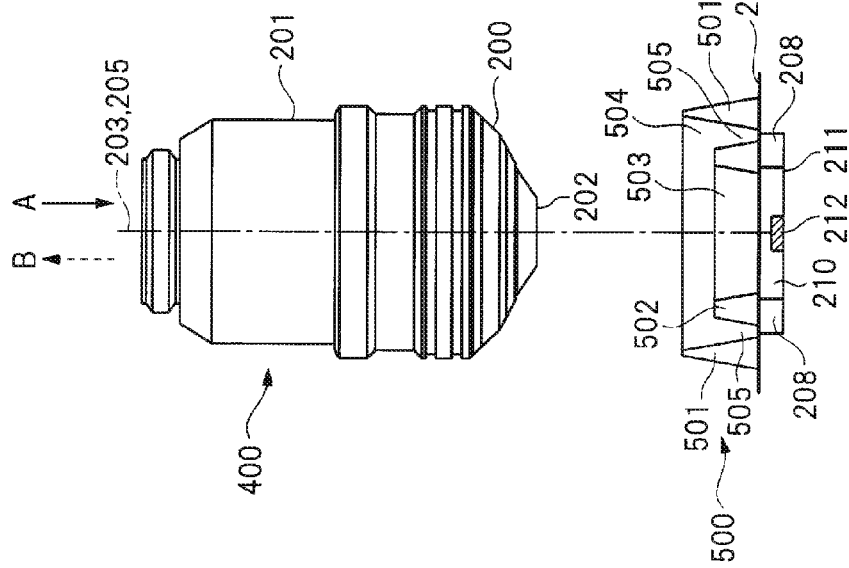

MICROSCOPE OBSERVATION CONTAINER AND OBSERVATION DEVICE

TECHNICAL FIELD

The present invention relates to a microscope observation container and an observation device, and particularly to a microscope container to which a liquid immersion medium is added and an observation device using the same.

BACKGROUND ART

A method of filling a portion between a sample serving as an observation target and an objective lens of a microscope with a liquid to increase numerical aperture and obtain higher resolution has been employed in observation using the microscope. This method is called liquid immersion, and water, oil, glycerin, or the like is used as the liquid used for filling, that is, as a liquid immersion medium. In an ideal state, it is possible to obtain a higher resolution as a refractive index of the liquid immersion medium increases.

A technique that uses the liquid immersion method is illustrated in, for example, PTL 1 and PTL 2.

CITATION LIST

Patent Literature

PTL 1: Re-Publication of PCT International Publication No. WO 2007/116647
PTL 2: Japanese Patent Application Laid-Open No. 2010-217930

SUMMARY OF INVENTION

Technical Problem

The inventor of the present application has conducted studies and found out that it is important to solve the following two problems in the case of employing a liquid immersion method in observation using a microscope.

First, a first problem is a case in which the liquid immersion medium, which is supplied to a distal end of an objective lens, gradually evaporates so that the distal end of the objective lens dries when a sample is observed or measured using the liquid immersion medium over a long period of time. In this case, a measurement condition is changed as the distal end of the objective lens dries, and a problem that it is difficult to observe (measure) the sample under a target measurement condition occurs. It is considered that one of factors of the evaporation of the liquid immersion medium generated herein is that the liquid immersion medium evaporates into the surrounding environment due to observation (measurement) conducted for the long period of time, for example. In addition, when fluorescent light, Raman light, and the like, emitted from the sample, are observed in the observation, heat is generated by excitation light with which the sample is irradiated in order to generate the above-described observation light from the sample, and the liquid immersion medium evaporates due to the heat, which is considered as another one of the factors. Any of the factors causes the evaporation of the liquid immersion medium and the dryness of the distal end of the objective lens, and accordingly, it is difficult to perform observation under the target measurement condition.

It is considered that it is possible to solve the decrease of the liquid immersion medium caused by the evaporation by providing a mechanism (feed and drain mechanism), which feeds and drains the liquid immersion medium, and compensating the amount of decrease. Such a feed and drain mechanism is illustrated in, for example, PTL 2. However, the feed and drain mechanism requires a complicated configuration and is large and expensive as a device. In addition, it is considered that there is a risk that air bubbles are generated by a pump or the like, configured for feed and drain, and the air bubbles are mixed into the liquid immersion medium when the configuration becomes complicated, thereby inhibiting observation. In addition, the liquid immersion medium leaks from the feed and drain device, and the possibility that such leakage breaks the device always haunts when the configuration becomes complicated, and accordingly, the reliability of the device becomes problematic. Further, it is considered that various bacteria proliferate in a feed/drain channel when the feed and drain device is left without being operated, and it is necessary to perform maintenance in order to prevent the proliferation of various bacteria.

Incidentally, PTL 1 illustrates a technique in which a shape of a lens is devised and a flange, provided with an opening (hole), is provided in the periphery of the lens, for example, as a technique of removing the air bubbles mixed in the liquid immersion medium.

It is considered a case in which a liquid surface of the fed liquid immersion medium extends over an optical axis of the objective lens when the liquid immersion medium fails to be fed to a desired position or for a desired liquid amount as a second problem. That is, it is considered that a boundary of the liquid surface of the liquid immersion medium overlaps the optical axis. In this case, a problem that it is difficult to properly irradiate the sample with the excitation light due to the overlap and/or it is difficult to condense the fluorescent light and the Raman light which are generated by the irradiation with the excitation light.

When a specialized researcher operates an observation device using a microscope, it is possible to feed the liquid immersion medium to a desired position for a desired liquid amount. However, it is considered a case in which an observer other than the specialist uses the observation device in a hospital or the like, and further, it is considered that an easy device is used as the observation device. Thus, it is desirable to provide the device such that the observer other than the specialist can also easily and properly feed the liquid immersion medium to a desired position of the objective lens for a desired liquid amount.

An object of the present invention is to provide a small microscope observation container that is capable of preventing evaporation of a liquid immersion medium.

Other objects and novel characteristics in addition to the above-described ones of the present invention will be apparent from description of the present specification and the attached drawings.

Solution to Problem

An overview of representatives of the invention to be disclosed in the present application will be simply described as follows.

That is, a microscope observation container is used together with an objective lens barrel which includes a housing extending along a radiation direction of excitation light during observation. When a sample is observed by the above-described objective lens barrel, the sample serving as an observation target is accommodated in the microscope observation container. The microscope observation container is provided with a structure that includes a portion contacted by the objective lens barrel, a liquid immersion medium added by dispensation is collected by the structure, and the liquid immersion medium is sealed by the objective lens barrel and the structure as the portion is contacted by the objective lens barrel. It is possible to achieve downsizing since it is unnecessary to provide a feed and drain mechanism in the microscope observation container as the liquid immersion medium is added by dispensation, and it is possible to prevent the liquid immersion medium from evaporating since the liquid immersion medium is sealed by the objective lens barrel and the structure.

In an embodiment, provided is a microscope observation container that is suitable for observation using an objective lens barrel having an outer shape which becomes thinner in a conical shape along a radiation direction of excitation light. In this case, a portion, which is contacted by the objective lens barrel, is deformed to conform the outer shape which becomes thinner in the conical shape. Accordingly, a liquid immersion medium is more reliably sealed. In addition, it is possible to finely adjust a relative positional relationship between the objective lens barrel and a sample in the contact state through deformation. Accordingly, it is possible to finely adjust a position of the sample to be observed.

In addition, an observation device, which is provided with the microscope observation container and a stage that is capable of moving in a predetermined direction, is provided in an embodiment. In this case, a fixing mechanism to detachably (removably) fix the microscope observation container is provided in the stage. Accordingly, it is possible to prevent the microscope observation container from undesirably moving when the objective lens barrel and a conceptual body of the microscope observation container contact each other. In addition, it is possible to prevent the microscope observation container from being separated from the stage together with the objective lens barrel when the objective lens barrel and the microscope observation container are separated from each other. Further, it is possible to finely adjust the position of the sample to be observed in the contact state between the structure and the objective lens barrel since it is also possible to move the microscope observation container by moving the stage.

Further, a microscope observation container is provided with a structure which has a ring-shaped protruding portion contacted by an outside surface of an objective lens barrel in an embodiment. In addition, a liquid immersion medium in semisolid form is used as the liquid immersion medium, and a region, which is surrounded by the ring-shaped protruding portion, is filled with the liquid immersion medium. In this manner, it is possible to fill the region, surrounded by the ring-shaped protruding portion, with a suitable amount of the liquid immersion medium in advance, and to easily supply the suitable amount of the liquid immersion medium. In addition, it is possible to provide the cheap and small microscope observation container since a feed and drain mechanism is not required. In this embodiment, the semisolid form means a gel-like or gelatinous state.

Further, provided is a microscope observation container which is suitable for an inverted objective lens barrel in an embodiment. Excitation light is emitted to a sample from the top to the bottom in an upright objective lens barrel. On the contrary, the excitation light is emitted to the sample from the bottom to the top in an inverted system. In this embodiment, a structure of the microscope observation container is contacted by the objective lens barrel, and a liquid immersion medium is added in the structure during observation. The objective lens barrel is moved toward the sample to be observed in a state in which the microscope observation container is contacted by the objective lens barrel. In this embodiment, the microscope observation container is provided with the structure which includes a ring-shaped contact portion contacted by an outside surface of the objective lens barrel and a ring-shaped protruding portion protruding toward a radiation direction of excitation light when the ring-shaped contact portion is contacted by the objective lens barrel. The liquid immersion medium is added in a region surrounded by the ring-shaped protruding portion, and the sample is irradiated with the excitation light via the liquid immersion medium during observation. In this embodiment, it is possible to consider the microscope observation container and the objective lens barrel collectively as an objective lens barrel since the microscope observation container and the objective lens barrel are moved in an integrated manner during observation.

Advantageous Effects of Invention

An effect that can be obtained, by the representatives of the invention to be disclosed in the present application will be simply described as follows.

It is possible to provide a small microscope observation container that is capable of preventing evaporation of a liquid immersion medium.

BRIEF DESCRIPTION OF DRAWINGS

FIGS. 2A to 2C are diagrams illustrating each configuration of an objective lens and a microscope observation container according to Embodiment 1.

FIGS. 4A and 4B are diagrams illustrating each configuration of an objective lens and a microscope observation container according to Embodiment 2.

FIGS. 5A and 5B are diagrams illustrating each configuration of an objective lens and a microscope observation container according to Embodiment 3.

DESCRIPTION OF EMBODIMENTS

Figure 1:
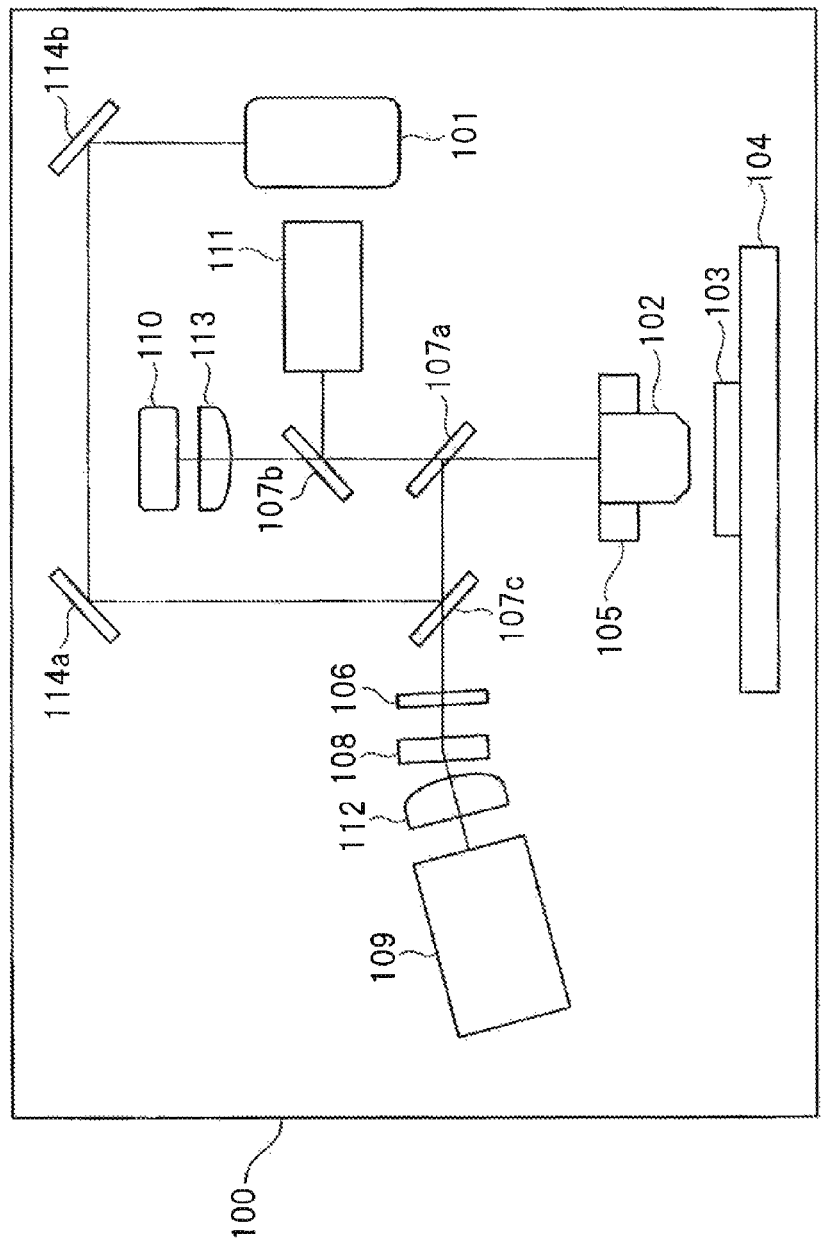
FIG. 1 is a block diagram illustrating a configuration of an observation device according to Embodiment 1.

Hereinafter, embodiments of the present invention will be described in detail based on the drawings. Incidentally, the same reference numerals will be attached to the same portions, in principle, in the entire drawing for describing the embodiments, and the repetitive description thereof will be omitted in principle.

In the embodiments below, although a description will be given by dividing the embodiment into a plurality of sections or embodiments if necessary for convenience, these are not irrelevant to each other excepting the case that is particularly demonstrated, but are in a relationship in which one is a modified example of part or all of the other, a detailed description, a supplementary description, or the like. In addition, in the embodiments below, when the number of elements and the like (including the number, a numeric value, a quantity, a range, and the like) are stated, the embodiment is not limited to a particular number excepting the case that is particularly demonstrated or a case in which the embodiment is clearly limited, in principle, to the particular number, and the number may be more than or less than the particular number. In addition, in the embodiments below, it is obvious that the constituent components (including component steps and the like) are not necessarily required, excepting the case that is particularly demonstrated or a case in which the components are clearly required in principle.

Similarly, in the embodiments below, when shapes, positional relationships and the like of the constituent components are stated, it is assumed that those substantially approximate to or analogous to the shapes and the like are included excepting the case that is particularly demonstrated or a case in which the components are obviously inappropriate in principle. This also applies to the numeric value and the range described above.

Embodiment 1

FIG. 1 is a configuration diagram illustrating a configuration of a microscope observation device 100. Herein, the description will be given by exemplifying an upright microscope observation device. In addition, the description will be given regarding a case in which a sample to be observed is irradiated with excitation light to generate fluorescent light or Raman light from the sample and both the light is observed.

The microscope observation device 100 includes a light source 101, an objective lens 102, lenses 112 and 113, a filter 106, beam splitters 107a to 107c, mirrors 114a and 114b, diffraction grating 108, a detector 109 a light source 110 for bright-field observation, and a two-dimensional detector 111 for bright-field observation. Further, the microscope observation device 100 is provided with a microscope observation container 103 housing the sample, an XY stage 104 that moves the microscope observation container 103 in the X-direction and the Y-direction, and a Z-axis adjusting mechanism 105 that moves the objective lens 102 in the Z-axis direction. Incidentally, a drive source, which drives the XY stage 104 and the Z-axis adjusting mechanism 105, is not illustrated.

The light source 101 generates external light (excitation light). As the sample is irradiated with the generated excitation light, the sample generates the fluorescent light or the Raman light (Raman scattered light). That is, the light source 101 generates the excitation light having a wavelength that can cause the sample to generate the fluorescent light or the Raman light through the irradiation. This light source 101 is known and, for example, a krypton (Kr) ion laser, a neodymium (Nd) laser, an argon (Ar) ion laser, a YAG laser, a nitrogen laser, a sapphire laser, or the like can be used as the light source 101.

The excitation light, generated by the light source 101, is changed in angle by the mirrors 114b and 114a and is emitted to the objective lens 102 via the beam splitters 107c and 107a. The objective lens 102 includes a plurality of lenses, and causes the excitation light to be converged such that the focus of the emitted excitation light is aligned to the sample (not illustrated) accommodated in the microscope observation container 103.

This microscope observation container 103 is installed on the XY stage 104. The XY stage 104 moves the microscope observation container 103 in the X-direction and the Y-direction which are the horizontal directions to adjust a position thereof in the horizontal direction (the X-direction and the Y-direction). In addition, the objective lens 102 is moved by the Z-axis adjusting mechanism 105 in the vertical direction (the Z-axis direction). In this manner, the microscope observation container 103 is adjusted by the XY stage 104 such that the sample therein reaches a predetermined position on a horizontal plane with respect to the objective lens 102, and the objective lens 102 is moved by the Z-axis adjusting mechanism 105 in the vertical direction such that the focus of the excitation light is aligned to the predetermined position of the sample. That is, the adjustment is performed such that the position of the sample serving as a measurement target reaches a region in which the light is condensed by the objective lens 102. In this drawing, the XY stage 104 and the Z-axis adjusting mechanism 105 are illustrated to be separated from each other, but it may be configured such that the XY stage 104 has the function of the Z-axis adjusting mechanism 105. In this case, it may be configured such that, for example, the XY stage 104 can move in three directions including the X-direction, the Y-direction, and the Z-direction.

As the sample in the microscope observation container 103 is irradiated with the excitation light, the sample generates the fluorescent light (or the Raman scattered light) depending on its configuration. The generated fluorescent light (or the Raman scattered light) reaches a diffraction grating 106 via the beam splitters 107a and 107c, and further, is incident to the detector 109 via the filter 108 and the lens 112.

It is possible to use an arbitrary spectroscopic detector as the detector 109 as long as the detector can detect the fluorescent light (or the Raman scattered light). For example, it is possible to use one or a plurality of one-dimensional or two-dimensional detectors as the detector 109 depending on the number of samples accommodated in the microscope observation container 103 and each arrangement thereof. Examples of the spectroscopic detector include a COD (charge-coupled device) image sensor, a CMOS (complementary metal, oxide semiconductor) image sensor, and an image sensor of another highly sensitive element (such as avalanche photodiode).

The detector 109 preferably includes a photomultiplier mechanism, for example, an image intensifier in order to prevent a decrease in sensitivity accompanying an increase in speed of detection. In addition, the detector 109 is preferably provided with a large-capacity memory which is capable of directly recording image information of the Raman scattered light or the like. Accordingly, it is possible to perform analysis at high speed without using a cable, a board, a computer or the like. For example, the observation device 100 may be further provided with a frame buffer memory to record a value observed by the detector 109. In addition, the observation device 100 may be connected to an output device (for example, a computer) which is configured to digitize and output the value observed by the detector 109.

The observation device 100 illustrated in FIG. 1 has a function for bright-field observation although not particularly limited.

The light source 110 for bright-field observation is configured using a LED, for example. The objective lens 102 is irradiated with LED light from the light source 110 via the lens 113 and the beam splitters 107b and 107a. The sample in the microscope observation container 102 is irradiated with the emitted LED light by the objective lens 102. The LED light reflected by the sample is incident to the detector 111 for bright-field observation via the objective lens 102 and the beam splitters 107a and 107b. A two-dimensional detector is used as the detector 111. For example, a CCD image sensor or a CMOS image sensor is used as the detector 111.

A portion to be desirably observed is specified in the sample through the bright-field observation, and accordingly, it is possible to irradiate the specified portion with, for example, the excitation light and detect the fluorescent light (or the Raman scattered) generated in the specified portion.

The sample, which is described in the specification of the present application, is irradiated with the excitation light via a liquid immersion medium added in the microscope observation container 103. Thus, the objective lens 102 is moved (adjusted) in the vertical, direction such that, for example, the focus of the excitation light is aligned to a desired position of the sample on consideration of a refractive index of the liquid immersion medium.

The observation device 100 illustrated in FIG. 1 is given as the example, and various modification thereof can be made depending on an object and/or a required accuracy of an observation device. For example, it is also possible to select a notch filter, a short-pass filter, a long-pass filter, or the like as the filter 106. In addition, the beam splitter, the mirror, the lens, and the diffraction grating, which have been described above, may also be omitted or newly added if necessary.

Next, a description will be given regarding the objective lens 102 and the microscope observation container 103, described above, with reference to FIGS. 2(A) to 2(C) and 3.

Figure 3:
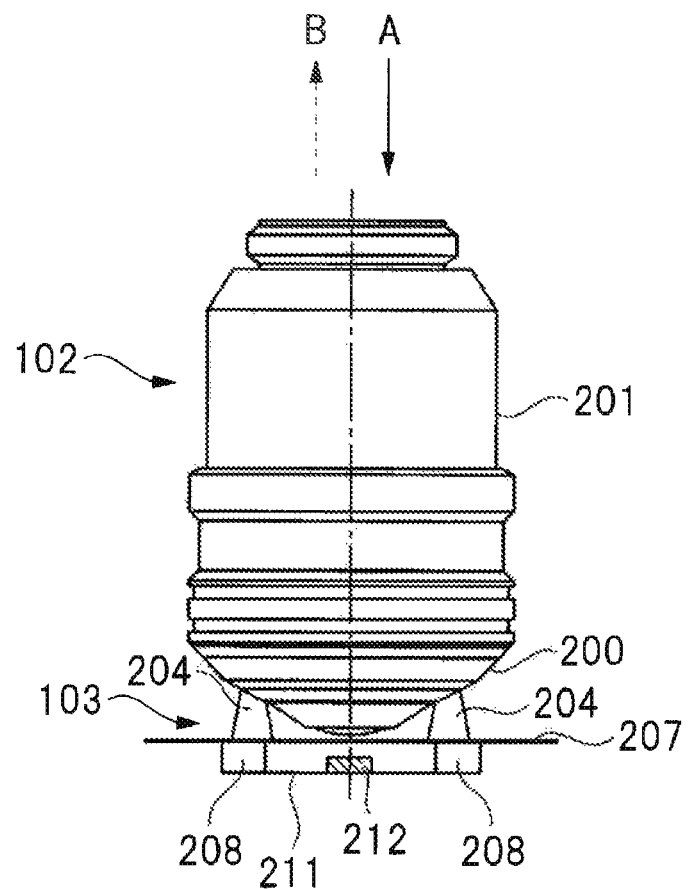
FIG. 3 is an explanatory diagram for describing Embodiment 1.

FIG. 2(A) is an external view illustrating an external appearance of the objective lens 102, and FIG. 2(B) is a cross-sectional view of the microscope observation container 103. FIG. 2(C) is a plan view of the microscope observation container 103 when viewed from the objective lens 102 side. In addition, FIG. 3 is an explanatory diagram for describing a conforming state between the objective lens 102 and the microscope observation container 103 during observation. Incidentally, FIG. 3 does not illustrate the liquid immersion medium, which is dispensed and added in the microscope observation container 103, in order to facilitate the description.

In FIG. 2(A), an arrow A in the solid line indicates a radiation direction of the excitation light, and an arrow B in the dashed line indicates a reflection direction of the fluorescent light, for example. That is, the arrow A indicates that the excitation light from the beam splitters 107a illustrated in FIG. 1 is emitted from the top to the bottom in FIG. 2(A). In addition, the arrow B indicates that the fluorescent light is reflected from the bottom to the top in FIG. 2(A). In the other drawings, the arrow A in the solid line indicates the radiation direction of the excitation light, and the arrow B in the dashed line indicates the reflection direction of the fluorescent light (or the Raman scattered light) in the same manner.

The objective lens 102 is a lens barrel that extends along the radiation direction of the excitation light (the arrow A) and includes a cylindrical housing portion (hereinafter, referred to also as a columnar housing portion in some cases) 201, which extends along the radiation direction of the excitation light and a conical housing portion 200 which similarly extends along the radiation direction of the excitation light. An outer shape of the cylindrical housing portion 201 is a cylindrical shape as understood from FIG. 2(A). Meanwhile, the conical housing portion 200 has an outer shape which becomes thinner along the radiation direction of the excitation light. The cylindrical housing portion 201 and the conical housing portion 200 are coupled with each other, and a plurality of lenses are provided on an inside surface thereof although not particularly limited. A focal length of the objective lens 102 is defined by combining the plurality of lenses. In addition, 202 indicates a distal end of the objective lens 102 in FIG. 2(A), and a lens is provided also in the distal end 202 although not particularly limited. Further, 203 indicates a central axis of the objective lens 102 in FIG. 2(A). In other words, the focus of the objective lens 102 is set on the central axis 203.

FIGS. 2(B) and 2(C) are the cross-sectional view and the plan view illustrating the configuration of the microscope observation container 103. The microscope observation container 103 is configured using a structure that includes a plurality of portions in this embodiment. That is, the structure is provided with a plate-shaped transparent portion 207 through which the excitation light can be transmitted, a ring-shaped portion 204 which has a trapezoidal cross-sectional shape in which a short side of the trapezoid faces the upper side, and a long side is fixed to a main surface of the transparent portion 207, a ring-shaped portion 208 which has a quadrangle cross-sectional shape and has one side being fixed to a rear surface of the transparent portion 206, and a plate-shaped portion 211 which is fixed to another side (side opposing the one side) of the ring-shaped portion 208. The sample 212 is fixed to the plate-shaped portion 211 during observation. In addition, the short side of the ring-shaped portion 204 is opened. In FIGS. 2(B) and 2(C), an inside surface of the ring-shaped portion 204 is indicated by 206. Incidentally, the ring-shaped portion 204 will be referred to as the ring-shaped portion 204 or the ring-shaped protruding portion 204 in some cases, hereinafter. Similarly, the ring-shaped portion 208 will be referred to as the ring-shaped portion 208, and the plate-shaped portion 211 will be referred to as the plate-shaped portion 211, in some cases.

Since the long side of the ring-shaped portion 204 is fixed to the main surface of the plate-shaped transparent portion 207, a space (region) 209 in which the short side of the ring-shaped portion 204 is opened is formed by the ring-shaped portion 204. In addition, a closed space (region) 210 is formed by the ring-shaped portion 208, the transparent portion 207, and the plate shaped portion 211 as understood from FIGS. 2(B) and 2(C). The sample 212 is accommodated in the region 210, and the liquid immersion medium is added in the region 209 by dispensation before performing observation. In addition, it is desirable to fill the region 210 with a liquid immersion medium before performing observation. In this case, the liquid immersion medium with which the region 210 is filled may be the same material as the liquid immersion medium dispensed in the region 209, or the region 210 may be filled with a liquid immersion medium using a different material. For example, when the sample 212 is a biological sample, it is considered that the region 210 is filled with a material suitable for the living body as the liquid immersion medium, and a liquid immersion medium of a material to achieve improvement of resolution is dispensed in the region 209.

In FIGS. 2(B) and 2(C), 205 indicates a central axis of the ring-shaped portion 204. In other words, the central axis of the structure forming the microscope observation container 103 is indicated by 205. The sample 212 is fixed at a position through which the central axis 205 passes.

The liquid immersion medium is added in the region 209 surrounded by the ring shaped portion 204 by dispensation before observation. Thereafter, the microscope observation container 103 is moved in the horizontal direction by the XY stage 104 (FIG. 1) such that the central axis 203 of the objective lens 102 and the central axis (the central axis of the ring-shaped portion 204) 205 of the structure conform to each other. Thereafter, the objective lens 102 is moved by the Z-axis adjusting mechanism 105 such that the distal end 202 of the objective lens 102 is inserted into the region 209 surrounded by the ring-shaped portion 204.

At this time, the focal length the objective lens 102 is defined according to its specification, and thus, a working distance of the objective lens 102 with respect to the sample 212 is set. In other words, a distance between the sample 212 and the objective lens 102 when the objective lens 102 is adjusted by the Z-axis adjusting mechanism 105 is defined. When the objective lens 102 is moved in the vertical direction by the Z-axis adjusting mechanism 105, a height and a length of the short side of the ring-shaped portion 204 are set such that an outside surface of the conical housing portion 200 of the objective lens 102 and the ring-shaped portion 204 contact each other in this embodiment. At this time, the contact is achieved such that the entire circumference of the ring-shaped portion 204 is in contact with the outside surface of the conical housing portion 200. Accordingly, the liquid immersion medium, added in the region 209 surrounded by the ring-shaped portion 204, is sealed by the outside surface of the conical housing portion 200 of the objective lens 102, the ring-shaped portion 204, and the transparent portion 207. Accordingly, the liquid immersion medium is sealed even when observation is performed over a long period of time, it is possible to prevent the evaporation. In addition, the addition of the liquid immersion medium is completed with one-time dispensation before measurement, and thus, a feed and drain mechanism is not required, and it is possible to achieve downsizing.

The ring-shaped portion 204 is configured using an elastic material having an elastic force in this embodiment. When the objective lens 102 is adjusted in the vertical direction by the Z-axis adjusting mechanism 105, the height of the ring-shaped portion 204 or the like is set such that the ring-shaped portion 204 is pushed and deformed by the outside surface of the conical housing portion 200 of the objective lens 102. Accordingly, when the vertical direction of the objective lens 102 is adjusted by the Z-axis adjusting mechanism 105 and the objective lens 102 and the ring-shaped portion 204 of the microscope observation container 103 contact each other, the ring-shaped portion 204 is deformed along a shape of the outside surface of the conical housing portion 200 as illustrated in FIG. 3. As a result, it is possible to further enhance the sealing performance. In addition, it is also possible to finely adjust the objective lens 102 and the sample 212 in each direction of the XYZ axes while maintaining the sealed state since the elastic material is used. In particular, a highly accurate positioning is required when the sample 212 serving as an observation target is irradiated with the excitation light in a scale of micrometer or nanometer, and thus, the fine adjustment is essential, which is resolved by expansion and contraction (deformation) of the elastic body.

Examples of the elastic material include rubber, and a nitrile rubber, a hydrogenated nitrile rubber, a fluorine rubber, a silicone rubber, an ethylene-propylene rubber, a chloroprene rubber, an acrylic rubber, a butyl rubber, a urethane rubber, a natural rubber, a fluorine resin, Teflon (PTFE), a chlorosulfonated polyethylene rubber, and an epichlorohydrin rubber as thermoplastic elastomer.

The region 209 in which the liquid immersion medium is added and the region (sample chamber) 210 in which the sample 212 is accommodated are isolated from each other by the plate-shaped transparent portion 207 in this embodiment. It is possible to use glass, quartz, and a plastic material such as acrylic, which has high transparency in a wavelength of the light source as the plate-shaped transparent portion 207. In this manner, it is possible to efficiently irradiate the sample 212 with the excitation light from the light source 101 by employing the transparent material. In addition, it is possible to prevent the objective lens from colliding the sample serving as the observation target by providing the ring-shaped portion 204, and to prevent the objective lens, which is expensive, from being scratched, for example. Further, it is also possible to fill the sample chamber 210 with the liquid immersion medium suitable for the sample 212 as described above.

Embodiment 2

FIGS. 4(A) and 4(B) are configuration diagrams of a microscope observation container and an objective lens according to Embodiment 2.

Embodiment 2 is similar to Embodiment 1, and thus, a difference therebetween will be mainly described. In FIGS. 4(A) and 4(B), 400 indicates an objective lens which has a similar configuration to the objective lens 102 illustrated in FIG. 2(A). A difference from the objective lens 102 illustrated in FIG. 2(A) is that the distal end 202 of the objective lens 400 in FIGS. 4(A) and 4(B) is flat. The other parts are the same as in the objective lens 102 illustrated in FIG. 2(A). In addition, 403 indicates a microscope observation container in FIGS. 4(A) and 4(B), a structure thereof has the same configuration as the microscope observation container 103 illustrated in FIG. 2(B) except that a material of the ring-shaped portion 204 is different.

FIGS. 4(A) and 4(B) illustrate a state before performing observation, and particularly, FIG. 4(A) illustrates the state in which a liquid immersion medium is dispensed and added in the region 209 surrounded by the ring-shaped portion 204 using a dispensation tip. In FIGS. 4(A) and 4(B), 402 indicates the dispensation tip which is configured to dispense the liquid immersion medium, and 401 indicates the liquid immersion medium which is added by dispensation.

When the observation using the liquid immersion medium is performed with the objective lens 400 having the flat distal end 202, it is desirable that a height of a liquid surface of the added liquid immersion medium 401 be higher than a vertex (height) of the ring-shaped portion 204 as illustrated in FIG. 4(A). This is possible when the liquid surface is set to be higher than the vertex of the ring-shaped portion 204 (convex meniscus) using surface tension of the liquid immersion medium 401.

As illustrated in FIG. 4(A), first, the liquid surface of the liquid immersion medium 401 and the flat distal end 202 of the objective lens are brought into contact with each other when the liquid surface of the liquid immersion medium 401 is set to be higher, for example, in the case of moving the objective lens in the vertical direction (downward movement in FIGS. 4(A) and 4(B)) by the Z-axis adjusting mechanism 105 (FIG. 1) while aligning the central axes 203 and 205. Accordingly, the liquid surface of the liquid immersion medium 401 is brought into contact with the distal end 202 of the objective lens 400 without air being involved therebetween. As a result, it is possible to seal the liquid immersion medium 401 as described in Embodiment 1 without causing air bubbles to be involved between the sample 212 and the objective lens 400. For this reason, a material having a low affinity with the liquid immersion medium 401 is used as the ring-shaped portion 204 in this embodiment. A contact angle, which is an angle between the inside surface 206 of the ring-shaped portion 204 and the liquid surface of the liquid immersion medium 401, becomes large as the affinity is set to be low therebetween. For example, when water is used as the liquid immersion medium 401, a fluoroalkyl group or the like containing fluorine is introduced into the ring-shaped portion 204. Accordingly, it is possible to increase the contact angle by using a material having a low affinity with water, which is the liquid immersion medium 401, as the material of the ring-shaped portion 204. Incidentally, the lowering of the affinity means an increase in hydrophobic property in the case of using water as the liquid immersion medium 401.

When water is used as the liquid immersion medium and the ring-shaped portion 204 is configured using a material having a high affinity with water, the contact angle becomes small, and the liquid immersion medium 401 forms a liquid surface having concave meniscus as illustrated in FIG. 4(B). In this case, there is a possibility that air bubbles are mixed into the liquid immersion medium 401 between the sample 212 and the objective lens 400 in the case of bringing the objective lens 401 into contact, and accordingly, it may be difficult to perform a desired observation. Incidentally, for example, the inside surface 206 may be coated with a material having a low affinity with the liquid immersion medium instead of forming the ring-shaped portion 204 using the material having the low affinity. In this manner, it is also possible to increase the contact angle.

Further, it may be configured to detect the mixing of air bubbles using the two-dimensional detector 111 (FIG. 1) to perform the bright-field observation. In this case, it may be configured such that, for example, normal image information is acquired in advance, and the mixing of air bubbles is determined based on a difference from the information. It may be configured such that the observation device illustrated in FIG. 1 and an arithmetic processing function are combined, the difference from the normal image information is expressed as binarized information, and the presence of air bubbles is automatically determined.

When the respective central axes of the objective lens and the structure are aligned, the structure is filled with the liquid immersion medium, and the sealing is performed hermetically by adjusting the Z-axis as described above, it is possible to prevent the evaporation of the liquid immersion medium and to perform condensing while preventing the liquid surface of the liquid immersion medium from extending on the optical axis.

Embodiment 3

As illustrated in FIG. 4(A), the liquid immersion medium 401 is added such that the liquid surface thereof is equal to or higher than the vertex of the structure of the microscope observation container 403, that is, equal to or higher than a height of the ring-shaped portion 204. Further, when the objective lens 400 is moved in the Z-axis direction by the Z-axis adjusting mechanism 105 along the central axes 203 and 205 and the liquid immersion medium 401 is sealed by the objective lens 400 and the microscope observation container 403, the liquid immersion medium 401 overflows from the microscope observation container 403. There is a possibility that the overflowing liquid immersion medium 401 contaminates the surface of the microscope observation container 403 and the interior of the observation device 100 or the objective lens 400. According to Embodiment 3, it is possible to prevent the contamination caused by the overflowing liquid immersion medium 401.

Figure 6A:
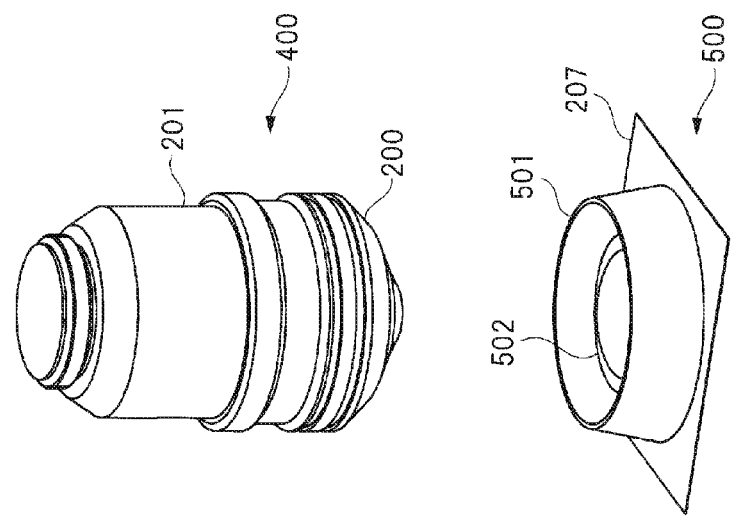
FIGS. 6A and 6B are perspective views illustrating each configuration of the objective lens and the microscope observation container according to Embodiment 3.
Figure 6B:
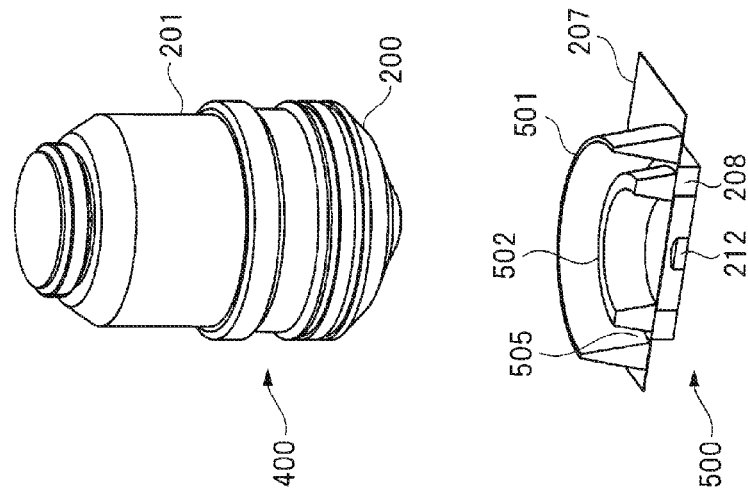

FIGS. 5(A) and 5(B) are configuration diagrams illustrating each configuration of an objective lens and a microscope observation container according to Embodiment 3. In FIGS. 5(A) and 5(B), the objective lens 400 has the same configuration as the objective lens 400 (FIG. 4(A)) which has been described in Embodiment 2, and thus, the description thereof will be omitted herein. Embodiment 3 is different from Embodiment 2 in terms of configuration of a microscope observation container 500. FIG. 5(A) illustrates a state before the objective lens 400 is moved toward the microscope observation container 500 by the Z-axis adjusting mechanism 105, and FIG. 5(B) illustrates a state in which the objective lens 400 is moved by the Z-axis adjusting mechanism 105 so that the objective lens 400 and the microscope observation container 500 contact each other. Incidentally, FIGS. 5(A) and 5(B) do not illustrate a liquid immersion medium. In addition, FIGS. 6(A) and 6(B) are perspective views of the state of FIG. 5(A). In particular, a cross section of the microscope observation container 500 is illustrated in the perspective view of FIG. 6(A). Next, Embodiment 3 will be described with reference to FIGS. 5(A) to 6(B).

In this embodiment, a ring-shaped portion (second ring portion) is further provided outside a ring-shaped portion (first ring portion) which has been described in Embodiment 2. That is, the microscope observation container 501 includes a ring-shaped portion 502 having a trapezoidal cross-sectional shape and a ring-shaped portion 501 provided outside the ring-shaped portion 502 in the plate-shaped transparent portion 207 which has been described in Embodiment 1 or 2. Incidentally, 208, 210 to 211 in FIGS. 5(A) and 5(B) indicate the same parts as in Embodiment 1 or 2, and thus, the description thereof will be omitted.

The ring-shaped portion 502, which has the trapezoidal cross-sectional shape, corresponds to the ring-shaped portion 204 which has been described above. The ring-shaped portion 501 has a cross-sectional shape being formed in an isosceles triangle, although not particularly limited, and a short side thereof is fixed to the plate-shaped transparent portion 207. That is, a vertex of the isosceles triangle protrudes toward a direction opposite to a direction of excitation light A. A center of the ring-shaped portion (hereinafter, referred to also as an outer ring-shaped portion) 501, provided outside the ring-shaped portion 502, is arranged to coincide with a center of the ring-shaped portion 502. In this manner, a space (region) 503, which is surrounded by the ring-shaped portion 502, is encompassed inside a space (region) 504 which is surrounded by the outer ring-shaped portion 501. In addition, a ring-shaped groove 505 is formed between the ring-shaped portion 502 and the outer ring-shaped portion 501. Incidentally, the ring-shaped portion 502 will be referred to also as the inner ring-shaped portion 502 for comparison with the outer ring-shaped portion 501 in some cases.

The liquid immersion medium is dispensed in the region 503 which is surrounded by the inner ring-shaped portion 502. Accordingly, the liquid immersion medium 401 is added such that a liquid surface thereof protrudes more than a vertex of the inner ring-shaped portion 502 similarly to the liquid immersion medium 401 illustrated in FIG. 4(A). Thereafter, the objective lens 400 is moved to a side of the microscope observation container 500 by the Z-axis adjusting mechanism 105 for observation.

As the objective lens 400 is moved in this manner, an outside surface of the conical housing portion 200 of the objective lens 400 is contacted by the ring-shaped portions 502 and 501, and the distal end 202 of the objective lens 400 is inserted into the region 503 which is surrounded by the inner ring-shaped portion 502 as illustrated in FIG. 5(B). At this time, the inner ring-shaped portion 502 is contacted by a first conical portion 200a on the outside surface of the conical housing portion 200, and the outer ring-shaped portion 501 is contacted by a second conical portion 200b on the outside surface of the conical housing portion 200. Each of the ring-shaped portions 501 and 502 is also configured using a material having an elastic force in this embodiment. Thus, a shape of the ring-shaped portion 502 contacted by the first conical portion 200a is deformed so as to conform to a shape of the first conical portion 200a. That is, the cross-sectional shape thereof is deformed from the trapezoidal shape. Similarly, a shape of the ring-shaped portion 501 contacted by the second conical portion 200b is deformed so as to conform to a shape of the second conical portion 200b. In this manner, the liquid immersion medium is more reliably sealed by the microscope observation container 500 and the outside surface of the objective lens 400.

Although not illustrated, the liquid immersion medium, which is added in the region 503 surrounded by the inner ring-shaped portion 502, overflows by the insertion of the distal end 202 of the objective lens 400 and flows into the ring-shaped groove 505 which is formed between the inner ring-shaped portion 502 and the outer ring-shaped portion 501. Accordingly, the overflowing of the liquid immersion medium from the region 503, which is surrounded by the inner ring-shaped portion 501, is allowed, and thus, it is possible to prevent the liquid immersion medium from entering the objective lens 400. In addition, the liquid immersion medium overflowing from the region 503 is collected in the groove 505, and thus, it is possible to prevent the contamination of the surface of the microscope observation container 500 and the observation device 100.

The outer ring-shaped portion 501 is configured to be contacted by the second conical portion 200b in this embodiment, but the invention is not limited thereto. The outer ring-shaped portion 501 is not necessarily contacted by the outside surface of the objective lens 400. In this case, the overflowing liquid immersion medium is also collected in the groove 505, and thus, it is possible to prevent the contamination caused by the overflowing of the liquid immersion medium.

Embodiment 4

Figure 7:
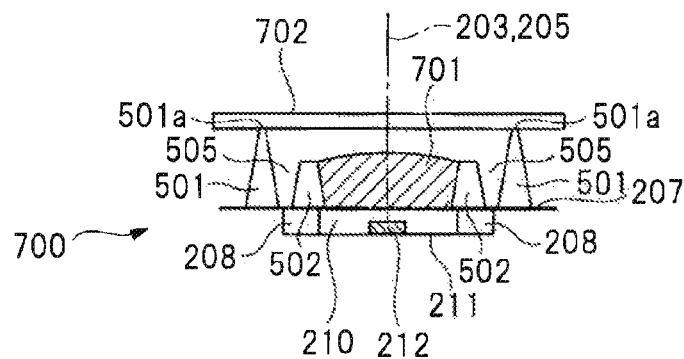
FIG. 7 is a cross-sectional view illustrating a configuration of a microscope observation container according to Embodiment 4.

FIG. 7 is a cross-sectional view illustrating configuration of a microscope observation container according to Embodiment 4. According to this embodiment, it is possible to achieve improvement in convenience of an observer (operator) who performs microscope observation. The microscope observation container according to this embodiment has the similar configuration to the microscope observation container 500, which has been described in Embodiment 3, and thus, a difference therebetween will be mainly described herein.

In this embodiment, a liquid immersion medium 701 in semisolid form is added in the region 503 (see FIGS. 5(A) and 5(B)) which is surrounded by the inner ring-shaped portion 502. Herein, the semisolid form means a gel-like state. The liquid immersion medium 701 in semisolid form is added in the region 503 in advance, and a sheet 702 is fixed to a vertex 501a of the outer ring-shaped portion 501. At this time, it is desirable to set a surface of the liquid immersion medium 701 in semisolid form to be higher than a vertex of the inner ring-shaped portion 502 in order to prevent the mixing of air bubbles. In addition, it is desirable that the sheet 702 be fixed to the vertex 501a on the entire circumference of the outer ring-shaped portion 501 from viewpoints of maintenance, storage, and airtightness.

A material having a high airtightness is used as the sheet 702. For example, an aluminum sheet is used as the sheet 702, and is fixed to the outer ring-shaped portion 501 using adhesive seal. Alternatively, a resin material such as polyethylene may be used as the sheet 702, and be fixed to the outer ring-shaped portion 501 using thermal adhesion.

A provider who provides a microscope observation container 700 adds the liquid immersion medium 701 in semisolid form in the region 503 in advance, fixes the sheet 702 to the outer ring-shaped portion 501, and then, provides the microscope observation container 700. At this time, the microscope observation container 700 is provided with the sheet 702 being fixed after confirming that there is no mixing of air bubbles in the liquid immersion medium 701 in semisolid form. Meanwhile, the observer who performs the microscope observation, for example, causes the sample 212 to be accommodated in the provided microscope observation container 700 and then, performs the observation. Accordingly, the observer can perform the observation without conducting work of dispensation and adding the liquid immersion medium for a required amount while preventing the mixing of air bubbles, thereby improving the convenience of the observer.

The observation is performed such that the microscope observation container 700 in which the sample 212 is accommodated is fixed to the XY stage 104, and the objective lens 400 is moved so as to cause the distal end 202 thereof to be inserted into the liquid immersion medium 701 in semisolid form using the Z-axis adjusting mechanism 105 while aligning the central axes 203 and 205 in the observation performed by the observer. The observer removes (peels off) the sheet 702 from the outer ring-shaped portion 501 during observation. Alternatively, the sheet 702 may be pierced by the objective lens 400.

Although FIG. 7 illustrates the example in which the sheet 702 is fixed to the outer ring-shaped portion 501, the sheet 702 may be fixed to the short side of the inner ring-shaped portion 502. That is, the sheet 702 may be arranged to oppose the transparent portion 207 such that the liquid immersion medium in semisolid form, with which the region surrounded by the ring-shaped portion 502 is filled, is sandwiched therebetween.

According to this embodiment, the liquid immersion medium 701 in semisolid form is sealed by the sheet 702 and the ring-shaped portion 502, and thus, it is possible to prevent the evaporation or dryness and to store the microscope observation container 700 in which the liquid immersion medium 701 is added over a long period of time.

Embodiment 5

Figure 8:
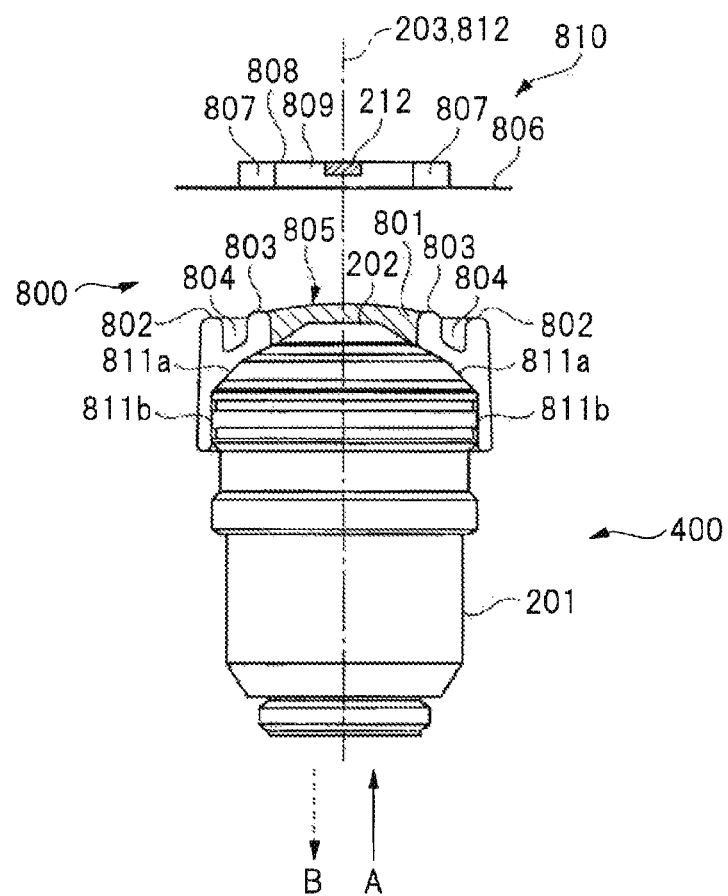
FIG. 8 is a diagram illustrating each configuration of an objective lens and a microscope observation container according to Embodiment 5.

FIG. 8 is a configuration diagram illustrating each configuration of an objective lens and a microscope observation container according to Embodiment 5. Embodiments 1 to 4 are applied to an upright microscope observation device that emits excitation light from the top to the bottom. In Embodiment 5, a microscope observation container, which is suitable for an inverted microscope observation device that emits excitation light from the bottom to the top, is provided.

In FIG. 8, 400 indicates the objective lens, and the objective lens 400 has the same configuration as the objective lens 400 according to Embodiment 3 which has been described above. Thus, the excitation light is emitted from the bottom to the top in the drawing as indicated by the arrow A in the solid line, and the sample 212 is installed above the objective lens 400 in this embodiment as illustrated in FIG. 8 although the description is omitted here.

The sample 212 is accommodated in a sample container 810 during observation. The sample container 810 has the same configurations as the plate-shaped transparent portion 207, the ring-shaped portion 208, and the plate-shaped portion 211 which have been described in Embodiment 3, for example. That is, the sample container 810 is provided with a plate-shaped transparent member 806, a ring-shaped member 807 which has a quadrangular cross-sectional shape and is fixed to the transparent member 806, and a plate-shaped member 808 which is provided on the opposite side of the transparent member 806 with the ring-shaped member 807 sandwiched therebetween, and the sample 212 is installed and accommodated in the plate-shaped member 808. The excitation light is emitted from the objective lens 400 via the transparent member 806, and the fluorescent light generated by the excitation light is incident to the objective lens 400 via the transparent member 806.

In FIG. 8, 800 indicates the microscope observation container which is attached to the objective lens 400. The microscope observation container 800 is provided with a structure including a bowl-shaped contact portion 811a, which is contacted by and conforms to the outside surface of the conical housing portion 200 (see FIGS. 4(A) and 4(B)) of the objective lens 400, and a cylindrical-shaped contact portion 811b which is contacted by and conforms to a partial outside surface of the cylindrical housing portion 201 of the objective lens 400. This structure is further provided with a ring-shaped portion (referred to also as an inner ring-shaped portion) 803, which protrudes along the radiation direction of the excitation light, and a ring-shaped portion (referred to also as an outer ring-shaped portion) 802 which is arranged outside the inner ring-shaped portion 803 and protrudes along the radiation direction of the excitation light. A center of the inner ring-shaped portion 803 and a center of the outer ring-shaped portion 802 are configured to coincide with each other, although not particularly limited, a ring-shaped groove 804 is formed between the outer ring-shaped portion 802 and the inner ring-shaped portion 803. The inner ring-shaped portion 803 is engaged with the bowl-shaped contact portion 811a, thereby forming an opened space. Incidentally, a diameter of the outer ring-shaped portion 802 is larger than a diameter of the inner ring-shaped portion 803 as apparent from the drawing.

The microscope observation container 800 is attached to the objective lens 400 at the time of performing observation. That is, the attachment is performed such that the cylindrical-shaped contact portion 811b and the bowl-shaped contact portion 811a are contacted by and conform to a part of the columnar housing portion 201 of the objective lens 400 and the conical housing portion 200, respectively, as illustrated in FIG. 8.

As the attachment is performed in this manner, a space (region) 805 is formed to have the distal end 202 of the objective lens 400 and apart of the conical housing portion 200 as a bottom surface, the bottom surface being surrounded by the inner ring-shaped portion 803. A liquid immersion medium 801 is dispensed and added in the region surrounded by the inner ring-shaped portion 803. A material having a low affinity with the liquid immersion medium 801 is also used as a material of the inner ring-shaped portion 803 in this embodiment. Accordingly, when the liquid immersion medium 801 is added in the region 805, a liquid surface of the liquid immersion medium 801 is set to be higher than a vertex of the inner ring-shaped portion 803. In addition, the attachment is performed in this embodiment such that each center of the inner ring-shaped portion 803 and the outer ring-shaped portion 802 and the central axis 203 of the objective lens 400 coincide with each other.

FIG. 8 illustrates a state in which the microscope observation container 800 is attached to the objective lens 400 and the liquid immersion medium 801 is added. That is, a state before the microscope observation container 800 is contacted by the sample container 810 is illustrated. From this state illustrated in FIG. 8, the objective lens attached with the microscope observation container 800 is adjusted and raised by the Z-axis adjusting mechanism while causing a central axis 812 of the sample container 810 and the central axis 203 of the objective lens to coincide with each other. As the objective lens is raised, the plate-shaped transparent member 806 of the sample container 810 and each of a liquid surface of the liquid immersion medium 801 and the vertex of the inner ring-shaped portion 803 contact each other. At this time, a working distance of the objective lens 400 with respect to the sample 212 is set according to the specification of the objective lens 800 to be used, similarly to Embodiment 1. A height of the inner ring-shaped portion 803 is defined such that the liquid immersion medium 801 is hermetically sealed by the inner ring-shaped portion 803 of the structure of the microscope observation container 800, the objective lens 400, and the sample container 810 at the position of the objective lens 400 adjusted by the Z-axis adjusting mechanism.

Accordingly, the liquid immersion medium 801 is sealed by the transparent member 806, the inner ring-shaped portion 803, the distal end 202 of the objective lens 400 and a part of the conical housing portion 200 of the objective lens 400 during observation, and thus, it is possible to prevent the evaporation. In addition, the surface of the liquid immersion medium 801 is higher than the vertex of the inner ring-shaped portion 803, and thus, the liquid immersion medium 801 leaks out at the time of sealing. The leaked-out liquid immersion medium 801 is collected by the ring-shaped groove 804, and thus, it is possible to prevent the objective lens 400, the surface of the microscope observation container 800, or the observation device from being contaminated.

When the inner ring-shaped portion 803 is contacted by the transparent member 806, the outer ring-shaped portion 802 may be contacted by the transparent member 806 in the same manner, or may have a lower height than the inner ring-shaped portion 803 to prevent the contact.

In addition, it is desirable to use an elastic material as a material of the structure of the microscope observation container 800. Accordingly, it is possible to enhance air-tightness when causing the microscope observation container 800 and the objective lens 400 to conform to each other and to prevent the liquid immersion medium 801 from leaking. In addition, the inner ring-shaped portion 803 is deformed when the transparent member 806 and the inner ring-shaped portion 803 contact each other, and it is possible to more improve the hermetically sealing performance. Further, the fine-adjustment of the objective lens 400 becomes possible.

It may be also configured to detect the mixing of air bubbles using the two-dimensional detector 111 (FIG. 1) to perform the bright-field observation in this embodiment. It may be configured such that, for example, normal image information is, acquired in advance, and the mixing of air bubbles is determined based on a difference from the information. It may be configured such that the observation device and an arithmetic processing function are combined to automate the determination using information obtained by provisionally binarizing the difference from the normal image information.

As illustrated in FIG. 8, there is a possibility that the liquid immersion medium 801 overflowing from the structure contaminates the objective lens 400, the Z-axis adjusting mechanism (stage) or the like when the liquid immersion medium is hermetically sealed by adding the liquid immersion medium 801 to a state in which the liquid surface thereof is equal to or higher than the vertex of the structure and adjusting the Z-axis, and thus, the ring-shaped portion of the structure of the microscope observation container 800 is set to have a dual structure in which the liquid immersion medium 801 does not overflow from the structure so as to block the overflowing liquid immersion medium 801. A height and a position of the outer ring-shaped portion 802 may be also set to have a structure that allows a further hermetically sealed structure when the Z-axis is adjusted on consideration of the position with respect to the objective lens 400, similarly to the inner structure, so that hermetically sealing performance may be improved.

In addition, the inverted microscope observation device may be also configured such that a gel-like or gelatinous medium in semisolid form or the like is used as the liquid immersion medium 801 illustrated in FIG. 8, added in the microscope observation container 800 in advance, and hermetically sealed by a highly confidential sheet or the like so as to enable storage so that observation can be performed by omitting a preliminary adding operation of the liquid immersion medium. In this manner, it is possible to improve the convenience of the observer.

Although the description has been given with the example in which the microscope observation container 800 is attached to the objective lens 400, the objective lens 400 may include the microscope observation container 800. In this case, it is also possible to consider the microscope observation container 800 and the objective lens 400 collectively as an objective lens.

Embodiment 6

Figure 9A:
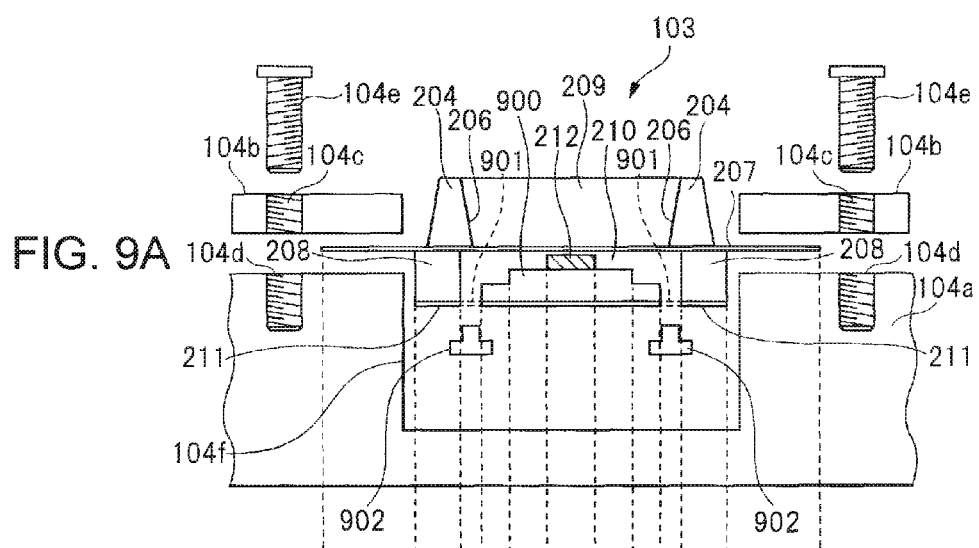
FIGS. 9A and 9B are diagrams illustrating each configuration of an XY stage and a microscope observation container according to Embodiment 6.
Figure 9B:
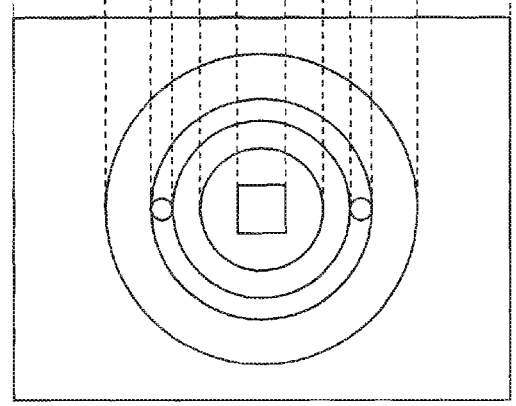

FIGS. 9(A) and 9(B) are a plan view and a cross-sectional view illustrating a configuration of the XY stage 104 according to Embodiment 6.

FIG. 9(A) is the cross-sectional view which is obtained by enlarging a portion of the XY stage 104 illustrated in FIG. 1 in which the microscope observation container 103 is attached. In addition, FIG. 9(B) is the plan view of the microscope observation container 103.

In FIG. 9(A), 104*a* indicates a portion which is a part of the XY stage 104 and is moved in the X-direction or the Y-direction by a drive source (not illustrated). A recessed portion 104*f*, which is configured for attachment of the microscope observation container 103, is provided in the XY stage portion 104*a*, and the microscope observation container 103 is attached to the recessed portion 104*f*. The microscope observation container 103 is similar to the microscope observation container 103 illustrated in FIG. 2(B), and is illustrated in more details in the enlarged manner in this drawing.

As described in FIG. 2(B), the structure of the microscope observation container 103 is provided with the plate-shaped transparent portion 207 and the ring-shaped portion 204 which is fixed to the main surface of the transparent portion 207 and has the trapezoidal cross-sectional shape. In addition, the ring-shaped portion 208, fixed to the rear surface of the transparent portion 207, and the plate-shaped portion 211 provided to sandwich the ring-shaped portion 208, are provided on the rear surface of the transparent portion 207. In this embodiment, a stepped protruding portion 900 is fixed to a central portion of the plate-shaped portion 211, and the sample 212 is fixed to a vertex portion of the protruding portion 900. In addition, two holes 901 are opened in the plate-shaped portion 211 although not particularly limited. The space for sample (sample chamber) 210 is formed by the transparent portion 207, the ring-shaped portion 208, and the plate-shaped portion 211. In this embodiment, the sample chamber 210 is filled with the liquid immersion medium via the hole 901 at the time of observing the sample 212, and the hole 901 is plugged by a lid 902 after the filling.

The microscope observation container 103, which has the sample 212 being fixed, the sample chamber 210 being filled with the liquid immersion medium, and the hole 901 being plugged by the lid 902, is installed such that a portion of the sample the chamber 210 is fit to the recessed portion 104*f*. At this time, the installation is performed such that the transparent portion 207 is placed outside the recessed portion 104*f*. This portion of the transparent portion 207, which is placed outside the recessed portion 104*f*, is sandwiched between a fixing member 104*b* and the XY stage portion 104*a*. Screw holes 104*c* and 104*d* are provided in the fixing member 104*b* and the XY stage portion 104*a*, respectively, and the fixing member 104*b* is fixed to the XY stage portion 104*a* by passing screws 104*e* through in the screw holes 104*c* and 104*d* during observation. Accordingly, the microscope observation container 103 is fixed to the XY stage 104. In addition, the microscope observation container 103 is removed by unscrewing the screw 104*e* when the observation ends, for example. That is, the microscope observation container 103 is detachably (removably) fixed to the XY stage 104. Of course, the liquid immersion medium is dispensed and added in the region 209 surrounded by the ring-shaped portion 204 during observation in the manner that has been described in the above embodiments.

In this manner, it is possible to perform the fine-adjustment by fixing the microscope observation container 103 to the XY stage 104, using the elastic material as the ring-shaped portion 204, and moving the XY stage 104 or the objective lens 102. In addition, it is possible to prevent the microscope observation container 103 from turning into the state of being adsorbed to the objective lens 102 at the time of removing the objective lens 102 from the microscope observation container 103. Further, it is possible to prevent the position of the microscope observation container 103 from undesirably moving when the ring-shaped portion 204 is deformed.

According to this embodiment, it is possible to use different materials as the liquid immersion medium, which is added in the sample chamber 210, and the liquid immersion medium which is added in the region 210. Thus, it is possible to use the liquid immersion medium which is suitable for the sample. In particular, it is possible to add a liquid immersion medium of a material, which is capable of maintaining a living body, in the sample the chamber 210 and add a liquid immersion medium of a material, which is selected by prioritizing a refractive index, in the region 210 in the case of a biological sample, and it is possible to perform the microscope observation targeting the living body.

Incidentally, the microscope observation container 103 which has been removed from the XY stage 104 after observation ends may be discarded or reused.

In addition, although the description has given with the example in which the fixing member 104b including the screw hole 104c the screw hole 104d provided in the XY stage 104, and the screw 104e are used as fixing mechanisms that detachably fix the microscope observation container 103 to the XY stage 104, the invention is not limited thereto. For example, the microscope observation container 103 may be fixed to the XY stage 104 by preparing the fixing member 104b without the screw hole 104c and a spring and pressing the fixing member 104b against the XY stage 104 through the spring instead of the screw 104e.

Modification Example

Figure 10:
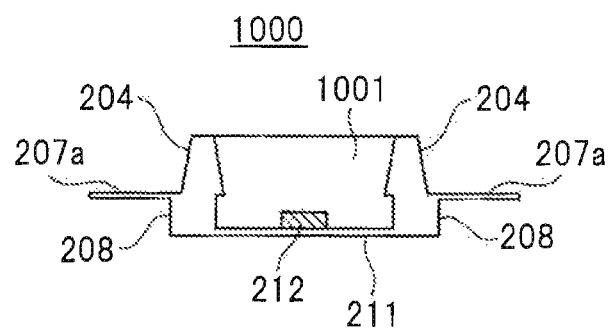
FIG. 10 is a cross-sectional view illustrating a modification example of the microscope observation container.

FIG. 10 is a cross-sectional view illustrating a modification example of the microscope observation container. In the drawing, 1000 indicates a microscope observation container. This modification example is similar to the microscope observation container 103 illustrated in FIG. 2(B). A difference from the microscope observation container 103 illustrated in FIG. 2(B) is that the plate-shaped transparent portion 207 is not interposed between a region in which a liquid immersion medium is dispensed and the sample 212. That is, a structure of a microscope observation container 1000 is provided with the plate-shaped portion 211, the ring-shaped portion 208 provided on the main surface of the plate-shaped portion 211, the plate-shaped portion 207a fixed to the ring-shaped portion 208, and the ring-shaped portion 204 which is fixed to the ring-shaped portion 208 and has the trapezoidal cross-sectional shape. Herein, the ring-shaped portions 204 and 208 and the plate-shaped portion 211 illustrated in FIG. 10 correspond to the portions 204, 208 and 211 illustrated in FIGS. 9(A) and 9(B), respectively. The plate-shaped portion 207a illustrated in FIG. 10 corresponds to the transparent portion 207 illustrated in FIGS. 9(A) and 9(B), but extends in the transverse direction without being interposed between the sample 212 and the objective lens in the drawing. The plate-shaped portion 207a is not interposed between the sample and the objective lens, and thus, is necessarily made of a transparent material, and is sandwiched between the fixing member 104b and the XY stage 104, and is used to fix the microscope observation container 1000 to the XY stage 104.

According to this modification example, the liquid immersion medium is dispensed and added in a region 1001 surrounded by the ring-shaped portions 204 and 208 during observation. Since the configuration of the structure becomes simple, it is possible to suppress an increase in price.

Embodiment 7

Figure 11:
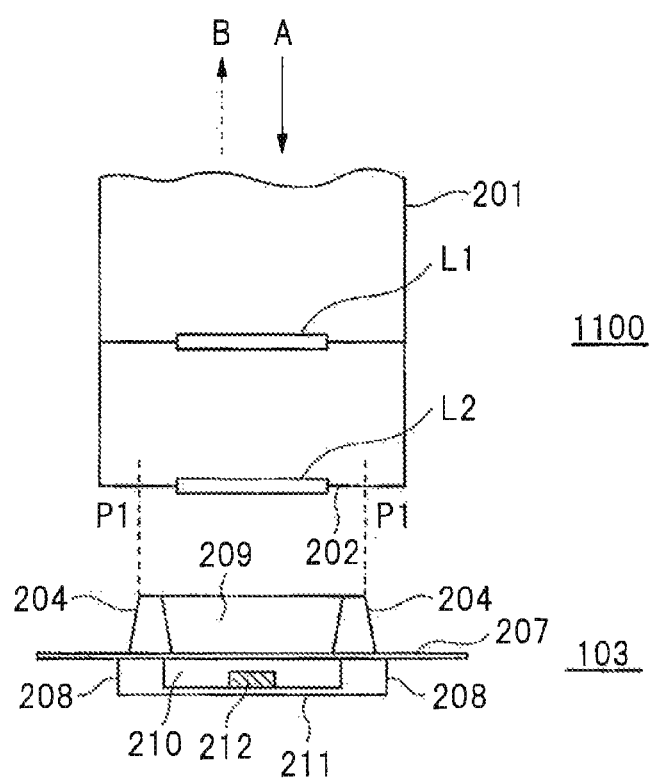
FIG. 11 is a diagram illustrating each configuration of an objective lens and a microscope observation container according to Embodiment 7.

FIG. 11 is a configuration diagram illustrating each configuration of an objective lens and a microscope observation container according to Embodiment 7. In FIG. 11, 103 indicates the microscope observation container, and 1100 indicates the objective lens. In this embodiment, the microscope observation container 103 is similar to the microscope observation container illustrated in FIG. 2(B), and thus, the description thereof will be omitted. The objective lens 1100 does not include the conical housing portion 200, but include a lens L2 at the distal end 202 of the columnar housing portion 201, which is different from the objective lens 102 illustrated in FIGS. 2(A) to 2(C).

Incidentally, the objective lens includes a plurality of lenses therein regardless of its outer shape although not illustrated in the other drawings. FIG. 11 illustrate two lenses L1 and L2, for example.

In this embodiment, the short side of the ring-shaped portion 204 (the short side of the trapezoid in the case of having the trapezoidal cross-sectional shape) is contacted by a ring-shaped position P1 at the distal end 202 of the objective lens 1100 during observation. That is, a diameter of the distal end 202 of the objective lens 1100 is larger than a diameter of the ring-shaped portion 204. In this case, a liquid immersion medium is also dispensed and added in the region 209 during observation. Thereafter, the distal end 202 of the objective lens 1100 is contacted by the ring-shaped portion 204. Accordingly, the ring-shaped portion 204 is deformed along a shape of the distal end 202 of the objective lens 1100. As a result, the liquid immersion medium is sealed by the plate-shaped transparent portion 207, the ring-shaped portion 204, and the distal end 202 of the objective lens 1100, and accordingly, it is possible to prevent the evaporation.

Although the description has been given in detail regarding the invention made by the present inventor based on the embodiments as above, the present invention is not limited to the embodiments, but can be modified in various ways within a scope not departing from a gist thereof. For example, a structure of a microscope observation container may have a light shielding property except for a portion through which excitation light is transmitted. In addition, a structure of a microscope observation container may be configured by combining a plurality of portions or in an integrated manner.

REFERENCE SIGNS LIST 100 observation device
101 light source
102 objective lens
103 microscope observation container
104 XY stage
105 Z-axis adjusting mechanism
200 conical housing portion
201 columnar housing portion
204, 208 ring shaped portion
207 transparent portion
212 sample
A direction of excitation light

The invention claimed is:

1. A microscope observation container that accommodates a sample measured by an objective lens in an objective lens barrel provided with a housing extending along a radiation direction of excitation light, wherein the objective lens is fixed to an inside surface of the housing, the microscope observation container comprising:
a structure that includes a portion contacted by the objective lens barrel during observation and a plate-shaped transmission portion, which is interposed between the sample and a liquid immersion medium and through which the excitation light is transmittable, the liquid immersion medium being contained in the structure, and the portion contacted by the objective lens barrel during observation being located above the plate-shaped transmission portion;
wherein the liquid immersion medium is sealed by the objective lens barrel and the structure during observation;
wherein the objective lens barrel is provided with a housing portion having an outer shape which becomes thinner in a conical shape along the radiation direction of the excitation light; and
wherein the portion contacted by the objective lens barrel is deformed to conform to the outer shape, which becomes thinner in the conical shape, of the objective lens barrel.

2. The microscope observation container according to claim 1, wherein
the portion has an elastic force.

3. The microscope observation container according to claim 1, wherein
the portion has an elastic force and is made of a material having a low affinity with the liquid immersion medium.

4. The microscope observation container according to claim 3, wherein
the portion has a first ring-shaped portion to be contacted by a first conical portion in the outer shape of the objective lens barrel, and
the structure has a second ring-shaped portion which has a diameter larger than a diameter of the first ring-shaped portion and is arranged outside the first ring-shaped portion such that a groove is formed between the first ring-shaped portion and the second ring-shaped portion.

5. The microscope observation container according to claim 4, wherein
the second ring-shaped portion is contacted by a second conical portion in the outer shape of the objective lens barrel during observation.

6. An observation device comprising:
a microscope observation container according to claim 1;
a stage that is capable of moving in a predetermined direction,
wherein the stage is provided with a fixing mechanism that removably fixes the microscope observation container to the stage.

7. The microscope observation container according to claim 1, wherein
the portion is made of an elastic member.

8. A microscope observation container that is used when a sample is measured by an objective lens in an objective lens barrel provided with a housing portion having an outer shape which becomes thinner in a conical shape along a radiation direction of excitation light, the microscope observation container comprising:
a structure that includes a ring-shaped portion contacted to an outside surface of the objective lens barrel during observation and a region which is surrounded by the ring-shaped portion and is filled with a liquid immersion medium in semisolid form.

9. The microscope observation container according to claim 8, wherein
the structure is provided with a transmission portion to which the ring-shaped portion is fixed and through which the excitation light is transmittable and a sheet which is arranged to oppose the transmission portion to sandwich the liquid immersion medium in semisolid form with which the region, surrounded by the ring-shaped portion, is filled.

10. A microscope observation container that is used when a sample is measured by an objective lens in an objective lens barrel provided with a housing portion having an outer shape which becomes thinner in a conical shape along a radiation direction of excitation light, the microscope observation container comprising:
a structure that includes:
a bowl-shaped contact portion contacted to an outside surface of the objective lens barrel during observation; and
a ring-shaped portion protruding toward the radiation direction of the excitation light,
wherein a liquid immersion medium is disposed in a region, which is surrounded by the ring-shaped portion, and the liquid immersion medium is disposed between the objective lens barrel and the sample.

11. The microscope observation container according to claim 10, wherein
the structure includes a second ring-shaped portion having a larger diameter than the ring-shaped portion, and the second ring-shaped portion is arranged outside the ring-shaped portion such that a groove is formed between the ring-shaped portion and the second ring-shaped portion.

12. A microscope observation container that accommodates a sample measured by an objective lens in an objective lens barrel provided with a housing extending along a radiation direction of excitation light and an objective lens fixed to an inside surface of the housing, the microscope observation container comprising:
a ring-shaped member contacted by the objective lens barrel during observation; and
a plate-shaped transmission member which is interposed between the sample and a liquid immersion medium and through which the excitation light is transmitted,
wherein a structure is formed such that the liquid immersion medium is contained in the ring-shaped member and the transmission member;
wherein the ring-shaped member is contacted by the objective lens barrel, and the liquid immersion medium is thereby sealed by the objective lens barrel, the ring-shaped member, and the transmission member during observation;
wherein the objective lens barrel is provided with a housing portion having an outer shape which becomes thinner in a conical shape along the radiation direction of the excitation light; and
wherein the portion contacted by the objective lens barrel is deformed to conform to the outer shape, which becomes thinner in the conical shape, of the objective lens barrel.

* * * * *